July 15, 1941.                L. A. MORRISON                2,249,158
                      ELECTROACOUSTIC TRANSDUCER
                         Filed May 19, 1939            3 Sheets-Sheet 1

INVENTOR
L. A. MORRISON
BY
Walter C. Kiesel
ATTORNEY

INVENTOR
L. A. MORRISON
BY
*Walter E. Kiesel*
ATTORNEY

Patented July 15, 1941

2,249,158

UNITED STATES PATENT OFFICE 2,249,158

ELECTROACOUSTIC TRANSDUCER

Louis A. Morrison, Madison, N. J., assignor to Bell Telephone Laboratories, Incorporated, New York, N. Y., a corporation of New York Application May 19, 1939, Serial No. 274,485

6 Claims. (Cl. 179—114)

This invention relates to electroacoustic transducers and more particularly to telephone receivers having a diaphragm assembly wholly or partly of magnetic material.

As is known, fundamentally the function of a telephone receiver is to convert electrical energy into mechanical vibrations of an element, such as a diaphragm, which element in turn produces complex sound waves corresponding to variations in the electrical energy. The operating characteristics of an electro-magnetic receiver are dependent in the main upon the efficiency of the magnetic system thereof and the efficacy of this system in converting variations in the flux therein into vibrations of the diaphragm assembly.

A recognized criterion for evaluating the performance of the magnetic system is the force factor, which may be defined as the ratio of the mechanical force produced to the electrical current producing it. In a receiver having a diaphragm entirely or partly of magnetic material and a magnetic structure including a coil or coils for producing a varying magnetic flux, the force factor may be expressed mathematically as $$G = n\frac{\partial \Phi}{\partial a} = nG_o$$

where $G$ is the force factor, $n$ is the number of turns in the coil or coils, and $$\frac{\partial \Phi}{\partial a} \text{ or } G_o$$

is the rate at which the total flux interlinking the diaphragm and the pole-pieces of the magnetic structure varies with displacement of the diaphragm.

A further criterion for the performance of such a telephone receiver is the figure of merit, which may be expressed mathematically as directly proportional to $$\frac{AG_o}{M_o}$$

where $A$ is the effective diaphragm area and $M_o$ is the effective mass of the diaphragm.

In receivers having magnetic diaphragms of uniform thickness, the ratio of $A$ to $M_o$ is inversely proportional to the diaphragm thickness inasmuch as the densities of the various ferromagnetic materials employed for the diaphragm are approximately the same. Hence, it follows that the figure of merit is proportional to the ratio of the force factor to the thickness of the diaphragm.

The useful force exerted upon the diaphragm in an electromagnetic telephone receiver is a function of the constant polarizing flux and the variable flux produced by the coil or coils. The principal factor entering into the determination of the variable flux is the alternating current permeability of the diaphragm and the associated air-gap or air-gaps. In general, the useful variable force exerted upon the diaphragm may be expressed mathematically as proportional to $$B_o\sqrt{\mu_a}$$

where $B_o$ is the flux density in the air-gap and $\mu_a$ is the apparent alternating current permeability of the diaphragm and the associated air-gap or air-gaps.

It is apparent from the foregoing that, in order to obtain a large useful force, the product $B_o\sqrt{\mu_a}$ should be high and, therefore, it is highly desirable that the flux density in the air-gap or air-gaps be high. However, the alternating current permeability of the diaphragm material inherently is a decreasing function of the flux density. Hence, there is a point beyond which an increase in the air-gap flux, $B_o$, will result in a decrease in the useful force exerted upon the diaphragm.

One general object of this invention is to obtain a high electroacoustic efficiency and high response level in electroacoustic transducers.

More specifically objects of this invention are to obtain a large force factor in, and a high figure of merit for a telephone receiver having a magnetic diaphragm unit.

In one illustrative embodiment of this invention, a telephone receiver comprises a magnetic diaphragm and a magnetic structure including a pair of pole-pieces having tips in juxtaposition to the diaphragm, a permanent magnet for polarizing the pole-pieces, and a signal coil or coils for producing a variable flux in the magnetic circuit including the pole-pieces and the diaphragm.

In accordance with one broad feature of this invention, means are provided in cooperative association with the diaphragm and the magnetic structure of the receiver for producing such relation among the various parameters of the magnetic system as to result in a very large force factor.

More specifically, in accordance with one feature of this invention, an auxiliary or biasing magnet is provided in cooperative relation with the diaphragm for producing therein a component of flux opposite in direction to that produced by the polarizing magnet, so that the apparent alternating current permeability of the diaphragm is increased without decreasing the flux in the air-gap or air-gaps between the diaphragm and the magnetic structure.

The invention and the above-noted and other features thereof will be understood more clearly and fully from the following detailed description with reference to the accompanying drawings in which:

Fig. 1 is a side view mainly in section of a portion of a hand telephone including a telephone receiver illustrative of one embodiment of this invention;

Figs. 2a to 2d, inclusive, are detail views in perspective of a number of forms of the auxiliary or biasing magnet;

Figure 8:
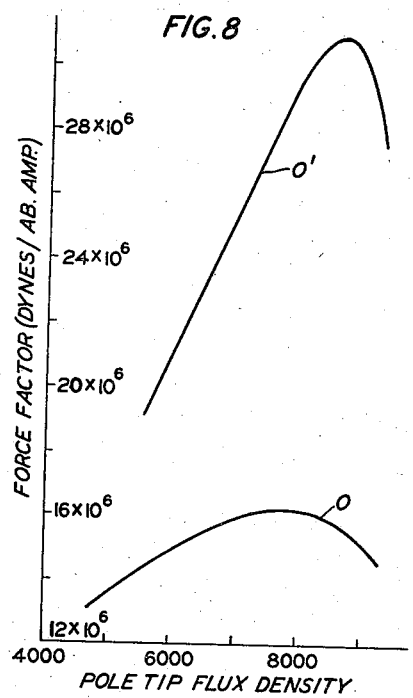
Figure 9:
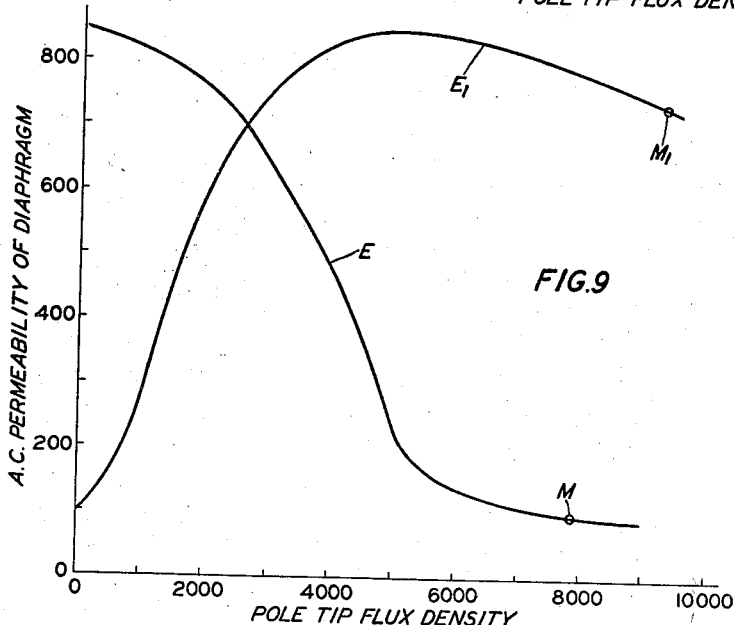

Fig. 8 is a graph showing typical comparative force factor-flux density curves for two receivers one of which included an auxiliary magnet in accordance with this invention and the other of which was of the same construction but did not include such auxiliary magnet; and Fig. 9 is another graph showing comparative diaphragm permeability-flux density characteristics for these two telephone receivers.

Figure 1:
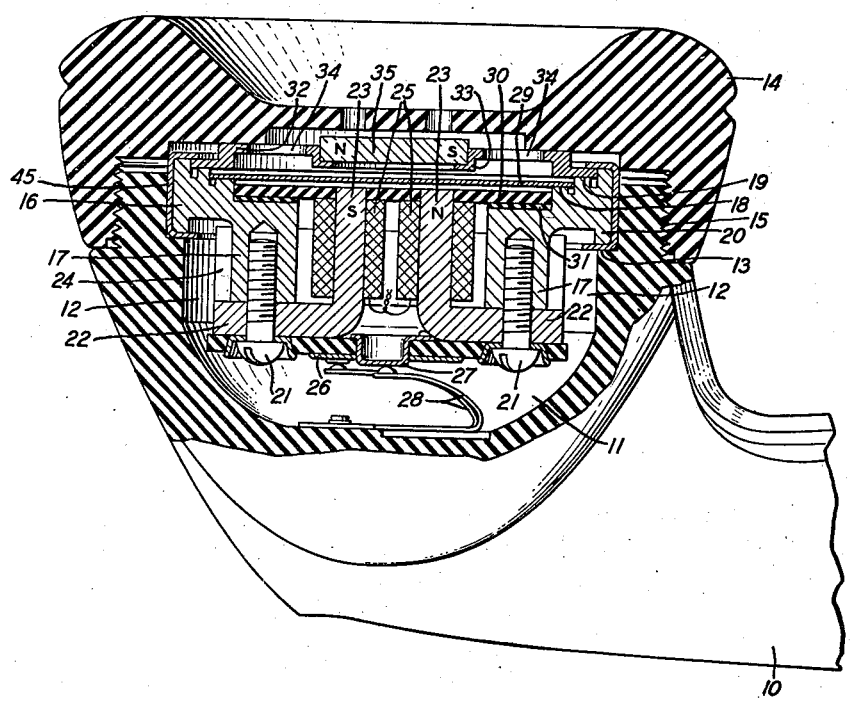

Referring now to the drawings, in Fig. 1 there is shown a portion of a telephone handset including a handle 10, preferably of molded insulating material, having therein at one end a cavity 11 in which a receiver unit, designated generally by the numeral 12, is mounted, the receiver unit being clamped against an annular seating surface or shoulder 13 by an apertured cap or ear-piece 14 threaded to the handle 10 as shown at 15.

The receiver unit 12, which may be of a construction generally similar to those disclosed in Patents 2,220,942, granted Nov. 12, 1940 and 2,231,084, granted Feb. 11, 1941 to Louis A Morrison and Edward E. Mott, and the application, Ser. No. 350,741, filed Aug. 3, 1940 of Edward E. Mott, comprises a support or frame, preferably of non-magnetic metallic material, such as an aluminum alloy, including an annular portion 16 and integral spaced projections or bosses 17, the annular portion having thereon a pair of annular projections 18 and 19 and a peripheral flange 20.

Affixed to the projections or bosses 17, as by screws 21, are a pair of shaped pole-pieces having legs 22 and tips 23 which terminate slightly below the plane of the face of the annular projection 18. The pole-pieces are oppositely polarized by a pair of bar magnets 24, only one of which is shown, seated upon the legs 22 and extending on opposite sides of the pole tip portions 23. Each of the pole tip portions 23 is encompassed by a signal or speech coil 25. The coils 25 may be serially connected between terminals 26 and 27 which are engaged by spring contacts 28 affixed to the handle 10 within the cavity 11 and connected by suitable conductors to the cord for the hand telephone.

A diaphragm 29, which may be a disc of magnetic material, is seated upon the projection 18 and held thereagainst solely by the magnetic attraction due to the magnets 24. An insulating disc 30, having apertures in which the pole tips 23 are fitted, is seated on an insulating washer 31 in turn seated on the annular portion 16 of the frame, and forms a damping chamber with the diaphragm.

Seated upon the projection 19 and spaced from the diaphragm 29 is an annular cap or cover plate 32 of non-magnetic material having a central flanged portion 33 and a plurality of apertures 34. The cap 32 may be held securely in position by a clamping band 45 having its edges spun over opposite ends of the flange 20. Preferably, the clearance between the outer portion of the cap or cover plate 32 and the peripheral portion of the diaphragm 29 is greater than that between the flanged portion 33 and the diaphragm so that the outer portion serves as a stop to limit displacement of the diaphragm should the diaphragm become detached from the annular seat 18.

Figure 2A:
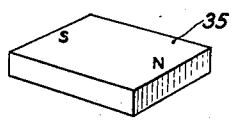
Figure 2B:
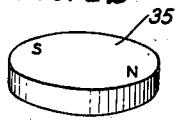
Figure 2C:
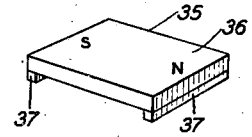
Figure 2D:
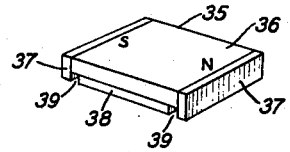

Seated in the flanged portion 33 of the cap or cover plate 32 is an auxiliary permanent magnet 35 polarized and oriented so that, as indicated in Fig. 1, its south pole is opposite the north pole tip 23 and its north pole is opposite the south pole tip 23. The auxiliary magnet 35 may be of any one of a number of forms, some of which are illustrated in Figs. 2a to 2d. In the form shown in Fig. 2a, the auxiliary magnet 35 is substantially square and magnetized to have its poles at opposite sides, as shown. In the form shown in Fig. 2b, the auxiliary magnet 35 is a circular disc magnetized to have diametrically opposite poles. In the form shown in Fig. 2c the auxiliary magnet comprises a bar magnet 36 having pole-pieces 37 integral therewith or attached thereto, the pole-pieces being of substantially the same form as the pole tips 23 and mounted in overlying relation therewith. As shown in Fig. 2d, the auxiliary magnet may comprise a bar magnet 36, opposite pole-pieces 37 integral therewith or attached thereto, and a shunt member 38 mounted between the pole-pieces 37 and spaced therefrom to form equal air-gaps 39.

The auxiliary magnet 35 may be of any one of a number of materials. For example, in the forms shown in Figs. 2a and 2b it may be of an alloy comprising 58 per cent iron, 29 per cent nickel and 13 per cent aluminum or 53 per cent iron, 20 per cent nickel, 10 per cent aluminum, 12 per cent cobalt and 5 per cent copper. In the forms shown in Figs. 2c and 2d, the magnet 36 may be of the alloys noted above and the pole-pieces 37 may be of permalloy, permalloy being an alloy containing 30 per cent or more of nickel and balance chiefly iron and having the characteristic property of high initial permeability. In the construction shown in Fig. 2d, the shunt 38 may be of permalloy.

In all forms, the auxiliary magnet 35 preferably is of such dimensions that it overlies substantially the same area of the diaphragm embraced by the pole tips 23. Preferably also, for reasons to be given hereinafter, the auxiliary magnet 35 is spaced from the diaphragm 29 a greater distance than the spacing between the diaphragm and the pole tips 23. A spacing ratio of from 4 to 1 to 10 to 1 has been found to be satisfactory.

Although the invention is not limited thereto, the following materials have been found to be particularly suitable for the elements of the magnetic system: diaphragm 29, an alloy comprising 49 per cent iron, 49 per cent cobalt and 2 per cent vanadium; magnets 24, an alloy of 53 per cent iron, 35 per cent cobalt, 7 per cent tungsten and 4 per cent chromium, or of 12 per cent cobalt, 16 or 17 per cent molybdenum and the remainder iron, or of 53 per cent iron, 12 per cent cobalt, 10 per cent aluminum, 20 per cent nickel and 5 per cent copper; and pole-pieces 22, 23, 45 per cent permalloy.

Figure 3:
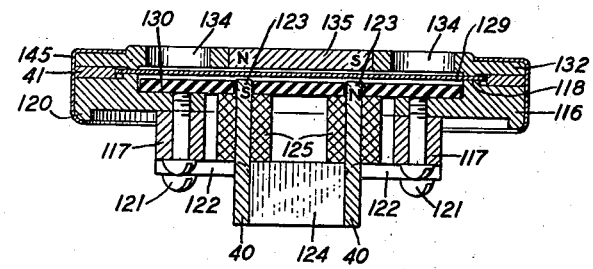
Fig. 3 is a side view in section of a telephone receiver illustrative of another embodiment of this invention.
Figure 4:
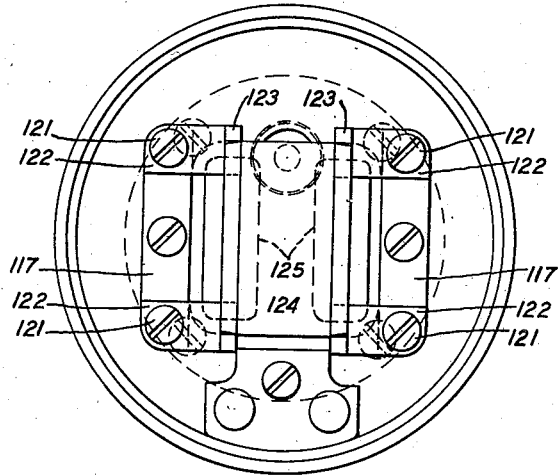
Fig. 4 is a bottom view of the receiver shown in Fig. 3.

In the embodiment illustrated in Figs. 3 and 4, the receiver unit is similar in general construction to that disclosed in the application Serial No. 274,484, filed May 19, 1939, of Edward E. Mott. In these figures, parts corresponding or substantially corresponding to parts of the unit shown in Fig. 1 are designated by the same reference character increased by 100. The receiver unit shown in Figs. 3 and 4 comprises an annular frame or foundation member 116 having affixed thereto or integral therewith rectangular bosses or projections 117. Preferably, the frame and bosses are of non-magnetic material, such, for example, as an aluminum alloy. The frame or foundation member is provided with an annular projection or seat 118 and a peripheral flange 120, the projection or seat 118 having mounted thereon the magnetic disc diaphragm 129 which is held in place solely by magnetic attraction.

Affixed to the projections or bosses 117, as by screws 121, are pole-pieces each having legs 122 seated upon one of the projections or bosses, a pole tip portion 123 and an extension 40. A bar magnet 124 is disposed between the extensions 40 and suitably affixed thereto, for example, by soldering or welding.

Each of the pole tip portions 123 has thereon a signal or speech coil 125, the coils being serially connected and retained in position by the magnet 124 and an insulating disc 130 seated upon the frame or foundation member 116 and having a pair of apertures in which the pole tip portions 123 are fitted.

Overlying the diaphragm 129 and spaced therefrom is a cap or cover member 132, of non-magnetic material, having therein a plurality of apertures 134 and a central aperture in which an auxiliary permanent magnet 135 is fitted. The magnet 135 may be of any of the forms and materials described heretofore in the description of Figs. 1 and 2 and is spaced from the diaphragm a distance greater than the gaps between the diaphragm and the pole tip portions 123. For example, a spacing ratio of from 4 to 1 to 10 to 1 may be employed. The desired spacing between the auxiliary magnet 135 and diaphragm 129 may be obtained by a non-magnetic annular washer 41 clamped between the frame and cover member by an annular band 145 spun over the frame and cover member.

The auxiliary magnet 135, whatever its form, is magnetized so that each of its poles is opposite the pole tip 123 of unlike polarity, and is of such size that it overlies substantially the same area of the diaphragm 129 as is embraced by the pole tips 123.

In a specific embodiment of the structure shown in Figs. 3 and 4, the magnet 124, diaphragm 129 and pole-pieces 122, 123 may be of the materials noted heretofore in the discussion of Fig. 1. The gaps between the diaphragm 129 and pole tip portions 123 may be .005 of an inch and the gap between the diaphragm 129 and auxiliary magnet 135 may be .030 of an inch. The magnet 124 may be rectangular in form and magnetized to have a magnetomotive force of 800 gilberts and the auxiliary magnet 135 may be a circular disc .580 of an inch in diameter and magnetized to have a magnetomotive force of 800 gilberts. The pole tip portions 123 may be 1/16 of an inch by 1/2 inch in section and spaced 7/16 of an inch, center to center.

As noted heretofore, the useful force exerted upon the diaphragm of a receiver of the type described is proportional to the quantity $B_0 \sqrt{\mu_a}$. In a magnetic circuit, the flux density and alternating current permeability vary with the magnetomotive force as indicated by the curves A and B respectively in Fig. 7 from which it is apparent that as the flux density increases the alternating current permeability decreases. It is clear that it would be desirable, in order to obtain a large force at the air-gap, to have both a high flux density in the air-gap and a high alternating current permeability. This highly desirable state is obtained by the use of the auxiliary magnet in accordance with this invention.

Figure 5:
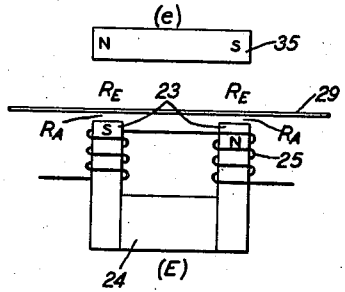
Fig. 5 is a diagrammatic representation of the magnetic system of the receivers illustrated in Figs. 1 and 3.

The effect of this magnet may be understood from Figs. 5 to 9 inclusive. In Fig. 5, the magnetic circuit of a telephone receiver of the constructions described above is shown diagrammatically and in Fig. 6 the electrical analog thereof is illustrated. In order to simplify the circuit and the consideration thereof, the two air-gaps $R_A$ in Fig. 5 have been shown as a lumped resistance $R_A$ in Fig. 6 and the two air-gaps $R_E$ in Fig. 5 have been shown as a lumped resistance $R_E$ in Fig. 6. In the latter figure, the battery $V_1$ produces a voltage E which corresponds to the magnetomotive force of the magnet 24, the battery $V_2$ produces a voltage e which corresponds to the magnetomotive force of the auxiliary magnet 35 and source $V_3$ produces an alternating current voltage which corresponds to the magnetomotive force of the coils 25. $R_d$ corresponds to the reluctance of the diaphragm 29, $I_d$ to the flux therein and $I_A$ to the flux in the air-gaps between the diaphragm 29 and the pole tip portions 23. $R_d$ has a value of $$R_d = \frac{L}{\mu A} = K\frac{1}{\mu} \qquad (1)$$

where L is the effective length of the flux paths in the diaphragm, A is the cross-sectional area of these paths and $\mu$ is the direct current permeability of the diaphragm material, which decreases with increases in the magnetomotive force.

Figure 6:
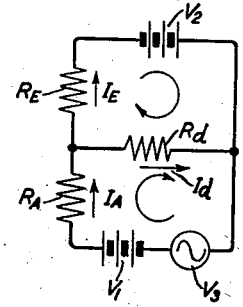
Fig. 6 is a circuit diagram showing the electrical analog of the magnetic system illustrated in Fig. 5.

In Fig. 6, if the branch circuit $R_E$, $V_2$ were absent, the steady current through the resistor $R_d$ is determined by the relation $$I_D = \frac{E}{R_A + R_d} \qquad (2)$$

From Equations 1 and 2 it will be seen that if E is increased a point will be reached where the current in $R_d$ and $R_A$ reaches a saturation value.

When, however, the entire circuit in Fig. 6 is considered, the steady current through the diaphragm becomes $$I_d = \frac{E}{R_A + \frac{R_A R_d}{R_E} + R_d} - \frac{e}{R_E + \frac{R_E R_d}{R_A} + R_d} \qquad (3)$$

As pointed out heretofore, the gaps between the auxiliary magnet 35 and the diaphragm are great as compared with the gap between the diaphragm and the pole tip portions 23 so that $R_E$ is relatively large and in Equation 3 the term $$\frac{R_A R_d}{R_E}$$

may be neglected. Equation 3 may then be written $$I_d = \frac{E}{R_A + R_d} = I_E$$

or approximately $$I_d = I_D - I_E \quad (4)$$

From Equation 4 it will be seen that the auxiliary magnet 35 neutralizes the flux due to the magnet 124 and reduces the steady flux in the diaphragm as compared with the same structure without the auxiliary magnet. If $$E = e\frac{R_A}{R_E}$$

the steady flux in the diaphragm would be zero. For practical purposes, however, in order to assure stable operation, it is desirable that E, that is, the magnetomotive force, be greater, for example 50 per cent to 100 per cent greater, than the factor $$e\frac{R_A}{R_E}$$

The current $I_A$ flowing through the resistance $R_A$ in Fig. 6 is represented approximately by the relationship $$I_A = \frac{E}{R_A + R_d} + \frac{e}{R_E + R_E R_A + R_A} \quad (5)$$

By comparing Equations 2 and 5 it will be seen that in a receiver having an auxiliary magnet 35, the flux density in the air-gap between the diaphragm and the pole tips 23 will be greater than that in a similar receiver without the auxiliary magnet. This is illustrated by curve A' in Fig. 7, which shows the flux in a receiver having an auxiliary magnet and which, it will be noted, has greater ordinates than the curve A for a receiver without such magnet. As noted heretofore, the auxiliary magnet results also in a decrease in the steady flux in the diaphragm. This, in turn, means an increase in the apparent alternating current permeability inasmuch as, as noted above, the apparent alternating current permeability is an inverse function of the flux density. Therefore, the auxiliary magnet produces an increase in both factors of the relation $B_0 \sqrt{\mu_a}$ and results in an increase in the useful force exerted upon the diaphragm.

Figure 7:
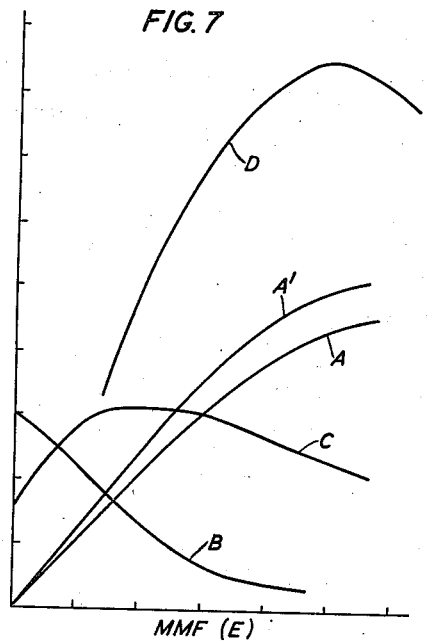
Fig. 7 is a graph showing typical force, flux and permeability curves for a magnetic circuit having an air-gap therein.

As indicated by the curve C in Fig. 7, the auxiliary magnet 35 results in a shifting to the right of the permeability curve B so that the maximum $\mu_a$ occurs at a higher magnetomotive force in the polarizing magnet 24. This, in turn, results in a maximum of the product $B_0 \sqrt{\mu_a}$ at a higher value of flux density $B_0$. The relation between the product $B_0 \sqrt{\mu_a}$ and the magnetomotive force is illustrated by curve D in Fig. 7.

The curves E and $E_1$ in Fig. 9, illustrate comparatively the relationship between the apparent alternating current permeability and pole tip flux density in a receiver without an auxiliary magnet (curve E) and the same receiver with an auxiliary magnet (curve $E_1$). Tests have shown that for the first a maximum force factor obtains at the point M on curve E and that for the second the maximum force factor obtains at the point $M_1$, on curve $E_1$.

The relative magnitudes of the force factors in receivers of the same construction, except that one includes an auxiliary magnet 35, may be appreciated from Fig. 8 wherein curve O indicates the force factor variation with flux density in a receiver of the construction shown in Figs. 3 and 4 without the magnet 35 and curve O' indicates the relation for the receiver with the auxiliary magnet 35.

As pointed out heretofore, one criterion for evaluating the over-all performance of a telephone receiver is the ratio of the force factor to the thickness of the diaphragm. The thickness of the diaphragm, of course, is determined by, among other factors, the magnitude of the flux it must carry. It will be apparent that, inasmuch as the auxiliary magnet 35 reduces the flux in the diaphragm, a relatively thin diaphragm may be employed and this in turn enables the attainment of a high figure of merit.

Although specific embodiments of the invention have been shown and described, it will be understood, of course, that they are but illustrative and that various modifications may be made therein without departing from the spirit and scope of this invention as defined in the appended claims.

What is claimed is:

1. An electroacoustic transducer comprising a magnetic structure including a permanent magnet, a diaphragm, means supporting said diaphragm opposite said structure, an auxiliary permanent magnet opposite the face of said diaphragm remote from said structure, said magnetic structure and auxiliary magnet having their pole portions in juxtaposition and juxtaposed pole portions being of unlike polarity, and means for impressing an alternating magnetomotive force upon said magnetic structure only, the magnetomotive force of said first magnet being of the same order of magnitude as the magnetomotive force of said second magnet, and the reluctance of the circuit including said diaphragm and said first magnet being less than the reluctance of the circuit including said diaphragm and said second magnet.

2. A telephone receiver comprising a diaphragm, means for actuating said diaphragm comprising a magnetic structure including a pair of spaced pole-pieces having pole tips adjacent one surface of said diaphragm and a permanent magnet for polarizing said pole tips, and a circular auxiliary magnet in juxtaposition to the opposite surface of said diaphragm having diametral poles each of which is in alignment with the pole-piece of opposite polarity thereto.

3. A telephone receiver comprising a diaphragm, actuating means therefor including a magnetic structure having spaced pole tips of opposite polarity in juxtaposition to one surface of said diaphragm, a permanent magnet having pole-pieces in juxtaposition to the other surface of said diaphragm and each opposite the pole tip of unlike polarity thereto, and a magnetic shunting member between said pole-pieces and spaced therefrom.

4. An electroacoustic transducer comprising a vibratile magnetic member, a magnetic circuit including said magnetic member, an air gap and a source of unidirectional magnetomotive force for producing a constant component of flux threading said member, a second magnetic circuit including said magnetic member, an air gap and a source of unidirectional magnetomotive force for producing in said member a constant component of flux in opposition to and different in magnitude from said first component of flux, and signal means for superimposing a variable magnetomotive force upon only the greater of said unidirectional magnetomotive forces.

5. An electroacoustic transducer comprising a vibratile magnetic member, a magnetic circuit including said magnetic member, an air gap and a source of unidirectional magnetomotive force for producing a constant component of flux threading said member, a second magnetic circuit including said magnetic member, an air gap and a source of unidirectional magnetomotive force for producing in said member a constant component of flux in opposition to and different in magnitude from said first component of flux, and signal means for superimposing a variable magnetomotive force only on said first unidirectional magnetomotive force, said first unidirectional magnetomotive force being greater than the quantity $$e\frac{R_A}{R_E}$$

$e$ being said second unidirectional magnetomotive force, $R_A$ the reluctance of said first air gap and $R_E$ the reluctance of said second air gap.

6. An electroacoustic transducer comprising a magnetic diaphragm, a magnetic system including a permanent magnet, a signal coil, and pole-pieces having their tips in juxtaposition to the central portion of one surface of said diaphragm, a cover member overlying the other surface of said diaphragm having a central recess and a plurality of apertures therein, and a permanent magnet fitted in said recess and having its poles opposite said tips, each of said poles being opposite the tip of unlike polarity thereto.

LOUIS A. MORRISON.

CERTIFICATE OF CORRECTION.

Patent No. 2,249,158. July 15, 1941.

LOUIS A. MORRISON.

It is hereby certified that error appears in the printed specification of the above numbered patent requiring correction as follows: Page 4, first column, lines 8-10, in the equation, for "$=I_E$" read -- $-I_E$ --; and that the said Letters Patent should be read with this correction therein that the same may conform to the record of the case in the Patent Office.

Signed and sealed this 4th day of November, A. D. 1941.

(Seal)

Henry Van Arsdale,
Acting Commissioner of Patents.